United States Patent [19]
Scott

[11] 3,727,041
[45] Apr. 10, 1973

[54] INSTRUMENT POINTER CONSTRUCTION
[75] Inventor: Harold T. Scott, Lynn, Mass.
[73] Assignee: General Electric Company, Wilmington, Mass.
[22] Filed: June 1, 1972
[21] Appl. No.: 258,822

[52] U.S. Cl. ............240/2.1, 116/129 R, 116/129 L, 240/8.16
[51] Int. Cl. ............................................G01d 11/28
[58] Field of Search..................240/2.1, 1 EL, 8.16; 116/124.4; 340/380; 116/129 R, 129 L

[56]         References Cited
         UNITED STATES PATENTS 2,902,970    9/1959    Kadlec..........................240/1 EL X
2,861,537    11/1958   Kadlec...........................116/129 R
3,033,155    5/1962    Beckman.........................240/2.1 X Primary Examiner—Richard L. Moses
Attorney—I. David Blumenfeld

[57]              ABSTRACT

A rearwardly illuminated instrument dial is provided which has a main dial scale around the outer periphery and a sub-dial in one quadrant. The instrument pointer for the sub-dial scale is a metallic disc mounted flush with the dial surface and having openings in the form of the dial pointer. This configuration results in equal illumination level over the entire dial face particularly in the area of the sub-dial while permitting transmitting dial scale member to be easily fabricated.

5 Claims, 3 Drawing Figures

PATENTED APR 10 1973  3,727,041
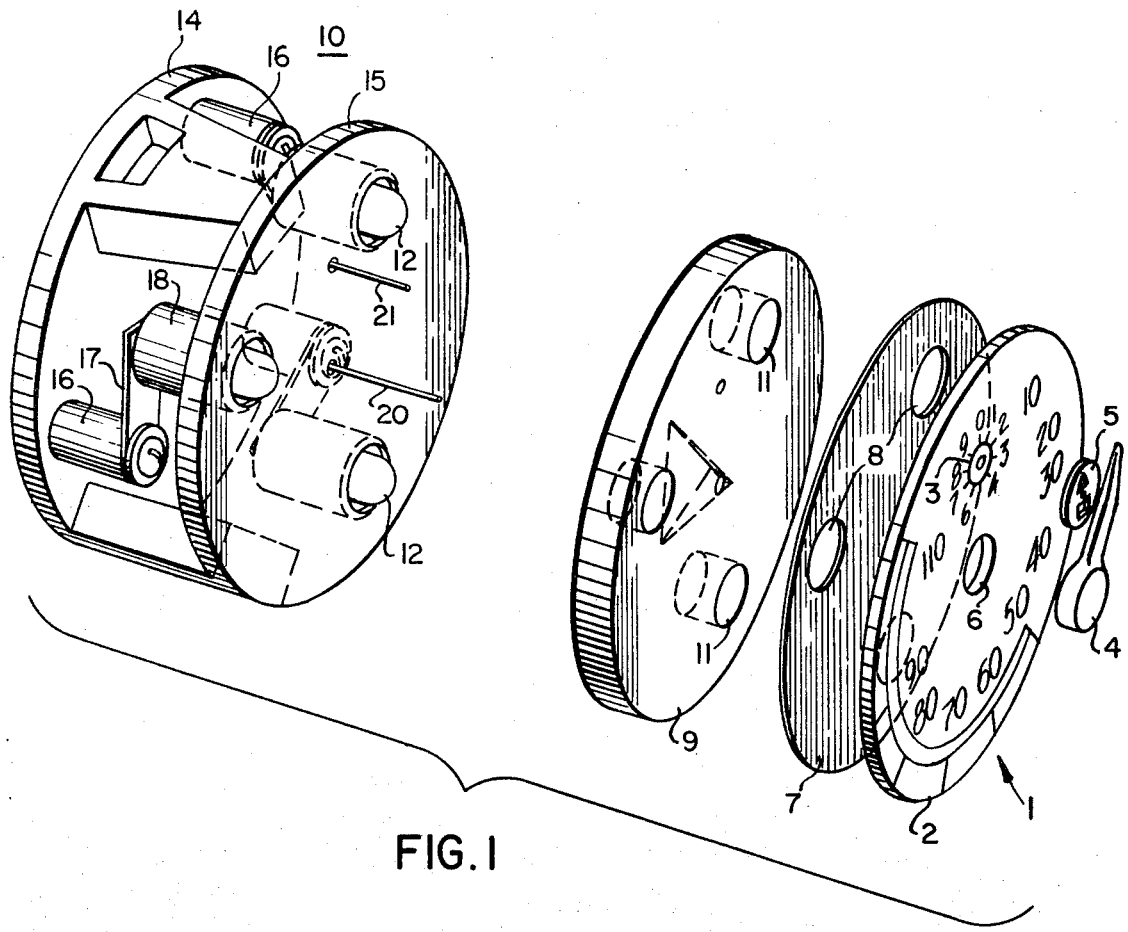
FIG. 1
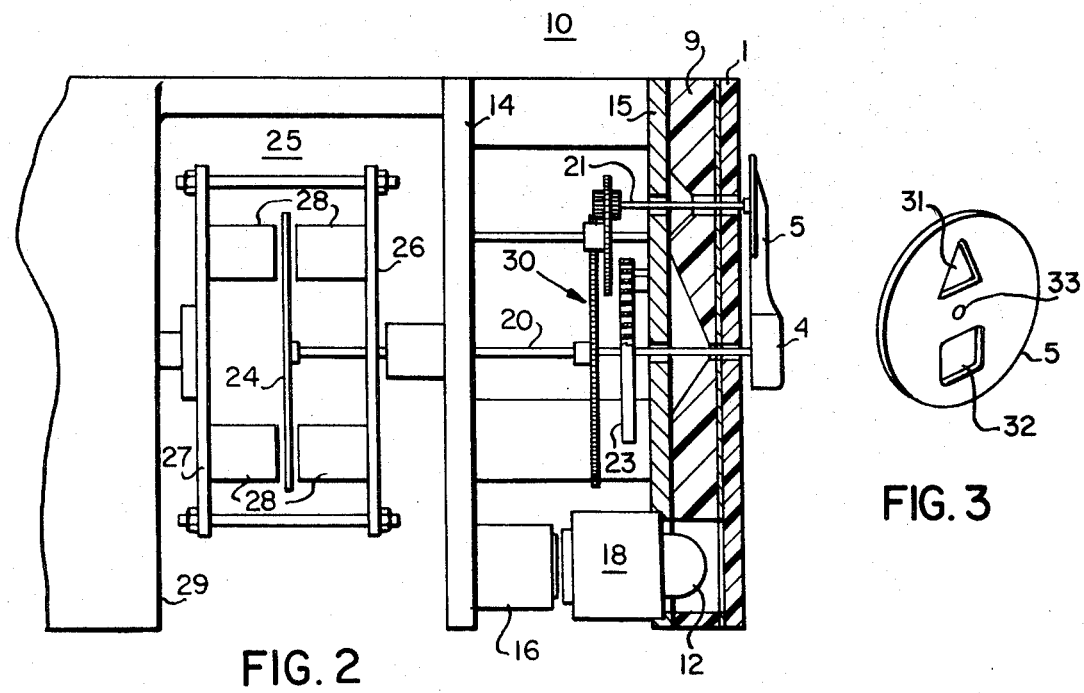
FIG. 2
FIG. 3

INSTRUMENT POINTER CONSTRUCTION

This invention relates to an illuminated instrument, and more particularly, to an illuminated dial face having an improved sub-dial pointer construction.

Illuminated instrument dials of the type having a light transmitting dial face and a plurality of light sources positioned behind the dial face to illuminate the scales on the front of the dial are well-known instrument configurations. Providing a uniform illumination level over the entire face of the instrument dial, however, often proves troublesome, particularly when a sub-dial is required. Typically, such sub-dials are constructed by providing a counter bore in the dial face and positioning a small light transmitting sub-dial pointer in the counter bore. However, such sub-dial or vernier dial constructions raise problems from the standpoint of even illumination of the dial face. Since the sub-dial pointer is mounted in a counter bore, the length of the light transmission path in the area of the sub-dial is different from that of the remainder of the dial. Furthermore, since a separate light transmitting element, namely the sub-dial pointer, is inserted in the counter bore, there is always the problem of matching the light transmitting characteristics of the sub-dial pointer to that of the remainder of the dial. As a result, the fabricating techniques required for such instruments has been complicated, thus adding to the cost of the device. For example, the sub-dial pointers must first be tested for chromaticity and light distribution characteristics, then mounted in the counter bore, and thereafter, the area in back of the counter bore must be treated by applying paint or other materials which affect the transmission characteristics of the light until the light intensity or chromaticity readings at the sub-dial face are identical with these over the remainder of the light instrument dial. Obviously, this rather complex manufacturing sequence is undesirable since the procedure is elaborate, time consuming and thus adds to cost.

In addition to the problems involved in manufacturing such an instrument dial to attain the desired even light distribution across the entire dial face, these prior art constructions had one further shortcoming. That is, since the sub or vernier dial pointer was mounted in a counter bore in the face of the dial, the pointer would often stick or bind in the counter bore. This, in turn, required more elaborate arrangements for mounting the dial on the shaft and also much closer tolerances in the device in order to avoid such sticking or binding. Consequently, there was additional complexity which added to the manufacturing process.

It is, therefore, a principal objective of the instant invention to provide an illuminated instrument dial having a sub or vernier dial on its face in which the illumination is constant across the dial face.

Yet another objective of the invention is to provide an illuminated instrument dial having a sub or vernier dial in which the vernier dial pointer is mounted externally of the dial face.

Other objectives and advantages of the instant invention will become apparent as the description thereof proceeds.

The various objectives and advantages of the invention are realized in a rearwardly illuminated instrument dial face which has a first set of scale markings or indications forming the main dial and a second set of scale markings or indications forming a sub or vernier dial. The sub-dial pointer is a disc mounted on a shaft with the pointer configuration punched out of the disc so that the light transmitted through the dial plate in the area of the vernier dial passes through the openings in the disc. In this manner, the instrument dial in the vicinity of the sub-dial has the same light distribution characteristics as the remainder of the dial without special treatment of the area either at the front or the rear of the light transmitting dial plate.

Other features believed characteristic of this invention are set forth in the appended claims. The invention itself, however, together with many objects and advantages thereof, will be best understood by reference to the following description taken in conjunction with the accompanying drawings in which:

FIG. 1 is an exploded perspective of the illuminated dial plate assembly.

FIG. 2 is an elevational view of the dial plate assembly and a portion of the indicator mechanism for driving the dial pointers.

FIG. 3 is a perspective of the disc shaped sub-dial pointer.

In FIG. 1, the illuminated dial assembly is shown in exploded form to illustrate the relationship of all the parts of the instrument dial assembly. Prior to discussing the precise details of this discussion, it must be pointed out that, for the sake of simplicity of illustration and description, such necessary items of the instrument of the housing and the transparent window are not shown since these are standard constituents of any instrument and are not of any significance to the invention being described here. The illuminated instrument dial assembly consists of a transparent dial plate 1 having a set of scale markings 2 around the outer periphery of the dial face and a sub dial scale 3, shown in the upper left quadrant of the dial.

The dial face is painted black with the exception of the scale markings 2 and the associated number so that the light transmitted through the dial plate illuminates the markings and numbers. The entire center of the sub-dial scale transmits light as do the scale markings and numbers associated therewith. A main instrument pointer 4 which is painted white, is mounted in a suitable opening 5 of the dial plate and a disc shaped sub-dial pointer 5 is mounted on a suitable opening at the center of the sub-dial scale 3.

The main instrument dial plate 1 is fabricated of any light transmitting plastic material and the surface of the dial plate, as pointed out above, is customarily painted black so as to block all light whereas the scale markings and numerals on the both of the dial scales 2 and 3 are light transmitting to provide the illumination of the dial face. The rear of the dial plate 1 is covered by a light transmission controlling coating shown generally at 7 which is deposited on the rear surface to control the light transmission characteristics of the dial plate both from the standpoint of light intensity as well as chromaticity. That is, both the light intensity as well as the color of the light transmitted may be controlled. Thus, if the scale markings are to be white, the coating may be white paint or the like so that monochromatic light is transmitted. If, on the other hand, color indications such as red is desired, at the front of the dial face, coating 7 may be any material which transmits light in the red portion of the spectrum. It will be understood, that although the coating 7 as shown as a disc, it may simply be a coat of white paint of varying thicknesses depending on the light transmission characteristics desired. A plurality of openings 8 which align with the light sources, presently described, are screened off so that no paint is deposited on these areas. A supporting disc 9 which may be fabricated of plastic or any other material is positioned between the dial scale 8 light bulb and gear supporting assembly shown generally at 10. A plurality of openings 11 in the support assembly, are aligned with screened portions 8 and align with a plurality of illuminating sources such as the light bulbs 12 which are mounted to the assembly 10.

Assembly 10 consists of a front frame bracket 15 supported on a rear frame bracket 14 by means of a plurality of supporting posts extending from the rear frame bracket. Positioned on rear frame bracket 14 are a plurality of stand-off insulators 16 which support a plurality of conductors 17 which are connected to a bulb holder or mounting elements 18. The conducting strips 17 are connected through a plurality of wires, not shown, to a source of voltage to provide energization for bulbs 12 which are mounted in the holders 18. Bulbs 12 as shown in FIG. 1 project through suitable holes in front frame bracket 15, with these holes being aligned with the corresponding holes in the lamp supporting member 9 and coating 7. As may be seen most clearly in FIG. 2 when assembled the bulbs project through the member 9 and are positioned adjacent to the rear portion of the instrument dial 1 and provide the source of illumination for the scale markings and numerals on the face of the dial.

The main pointer 4 and the sub-dial pointer 5 of the instrument dial are mounted on a main output shaft 20 and sub-dial shaft 21 respectively, which extend through suitable openings in the front frame bracket 15 supporting assembly 9 and dial face 1 to drive the two pointers in a manner presently to be described.

FIG. 2 illustrates the instrument dial as assembled as well as the drive mechanism for these pointers. Thus, dial face 1, supporting disc 9 and the bulb retaining assembly 10 are fastened together in any suitable manner to provide an integral assembly. Bulbs 12, bulb holders 18 and the stand-off insulator assemblies 16 mounted on the rear frame bracket of retaining assembly 10. Also mounted within the assembly 10 is the main output shaft 20 and the vernier output shaft 21 which drive pointers 4 and 5. Resilient restraint for the output shaft 20 is provided by a spiral spring 23 which has its inner end connected to the shaft and its outer end affixed to the front frame bracket 15. Actuating torque for deflection of pointers 4 and 5 is derived through interaction between an eddy current drag disc 24 and a drag magnet assembly 25 which is located co-linearly with output shaft 20 and is driven by a synchronous motor 26. Motor 26 is electrically coupled with a synchronous generator, not illustrated, so that the motor shaft rotates the magnet assembly at the same speed and synchronously with the generator shaft.

Drag magnet assembly 25 consists of two plates 27 and 28 which are fixed in a parallel relationship by suitable spacers and each plate has a plurality of equally spaced cylindrical permanent magnets 28 attached thereto and disposed so that opposite poles of the magnets face each other across a narrow air gap. The drag disc 24 is located in the gap between the two sets of magnets and intercepts the lines of magnetic flux concentrated there. The eddy currents induced in the magnetic drag disc by the rapidly rotating magnetic field from magnets 28 produces fluxes which in turn react with the permanent magnet fluxes to exert a torque upon the drag element 24. For any given speed of rotation of the magnet assembly a uniform predetermined torque is achieved, and disc 24 seeks to drive pointer 4 to an angular position at which the torque impressed by the restraining spring 23 is exactly equal and opposite to that induced by the drag disc.

Sub-dial pointer 5 is in turn driven by the drag magnet assembly through a gear assembly 30, which is of standard configuration to drive the sub-dial at a speed which is a multiple of the rotation of the main instrument pointer 4. Typically, sub-dial pointer 5 makes one complete revolution as the main pointer moves between any two scale markings, thereby giving a vernier indication.

As can be seen in FIG. 2, the sub-dial pointer 5 is positioned to move adjacent to the dial face surface and is in effect virtually co-planar therewith. The light transmitted through the vernier or sub-dial passes through suitable openings in the sub-dial pointer to provide an indication of the pointer position.

As may be seen most clearly in FIG. 3, sub-dial pointer 5 comprises a cylindrical or disc shape element which may be fabricated of any suitable material. A metallic disc of to .003 to .005 mil aluminum is one example of the construction of such a disc. The pointer takes the form of openings 31 and 32 which are punched through the disc and a shaft opening 33 into which the shaft 21 is mounted. The pointer assembly 5 can easily be made of a sheet of aluminum in a small punch press. The surface of the disc is then sprayed with black paint to conform with the remainder of the dial face and the openings 31 and 32 permit passage of illumination coming through the dial face to provide a pointed illumination of the sub-dial element.

It will be appreciated from the foregoing description, that a simplified highly effective sub-dial pointer construction has been provided which results in a rearwardly illuminated instrument dial face with a sub-dial, in which the illumination is uniform across the dial face without requiring any elaborate manufacturing and fabricating techniques to control the transmission characteristics of the light through the sub-dial face area. This is an obvious and important advantage in simplifying the manufacture of the device and reducing the cost of such instrument dial. While this invention has been described with particular reference to an illuminated instrument dial of a particular configuration, it will be obvious that modifications may be made in the instrumentalities of structures employed. It is contemplated by the appended claims to cover any such modifications which fall within the true spirit and scope of this invention.

What is claimed as new and desired to be secured by Letters Patent of the U.S. is:

1. A rearwardly illuminated instrument dial comprising, 1. a light transmitting dial member having a front surface and a first set of light transmitting scale markings on said front surface to provide a first indicating dial, a second set of light transmitting scale markings on said front surface comprising a sub-dial, said sub-dial having a light transmitting center portion, the remaining portion of the front surface of said dial member blocking transmission of light,
2. a plurality of light sources positioned at the rear surface of said dial to illuminate the scale markings,
3. a main dial pointer
4. a light blocking sub-dial pointer mounted adjacent to the surface of said dial member having light transmitting means in the form of an open passage therein, said open passage being superimposed over the light transmitting center portion of said sub-dial whereby said open passage acts as an illuminated sub-dial pointer.

2. The illuminated dial according to claim 1 wherein said open passage is formed in the shape of a pointer.

3. The illuminated dial according to claim 2 wherein said open passage comprises two passages jointly formed in the shape of a pointer.

4. The illuminated dial according to claim 1 in which said sub-dial pointer comprises a disc shaped element having a light transmitting opening therein.

5. The illuminated dial according to claim 1 in which said light transmitting opening comprises two openings formed in the shape of a pointer.

* * * * *